(12) United States Patent
Satyaseelan

(10) Patent No.: US 10,965,182 B2
(45) Date of Patent: Mar. 30, 2021

(54) HYBRID MODULE INCLUDING AXIAL RETENTION HOUSING FOR BEARING

(71) Applicant: Schaeffler Technologies AG & Co. KG, Herzogenaurach (DE)

(72) Inventor: Ayyalraju Satyaseelan, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 121 days.

(21) Appl. No.: 15/909,934

(22) Filed: Mar. 1, 2018

(65) Prior Publication Data

US 2019/0273410 A1 Sep. 5, 2019

(51) Int. Cl.
| | |
|---|---|
| H02K 5/16 | (2006.01) |
| H02K 5/173 | (2006.01) |
| H02K 7/108 | (2006.01) |
| H02K 7/00 | (2006.01) |
| B60K 6/48 | (2007.10) |
| B60K 6/26 | (2007.10) |
| B60K 6/405 | (2007.10) |

(52) U.S. Cl.
CPC ............ *H02K 5/163* (2013.01); *B60K 6/26* (2013.01); *B60K 6/405* (2013.01); *B60K 6/48* (2013.01); *H02K 5/1732* (2013.01); *H02K 5/1735* (2013.01); *H02K 7/006* (2013.01); *H02K 7/108* (2013.01); *B60K 2006/4825* (2013.01)

(58) Field of Classification Search
CPC ...... H02K 5/163; H02K 5/1735; H02K 7/108; H02K 5/1732; H02K 7/006; B60K 6/405; B60K 6/26; B60K 6/48; B60K 2006/4825

USPC ...................................................... 310/89, 90
See application file for complete search history.

(56) References Cited

U.S. PATENT DOCUMENTS

| | | | | |
|---|---|---|---|---|
| 6,258,001 B1 * | 7/2001 | Wakuta | .................. | B60K 6/405 475/5 |
| 8,647,078 B2 * | 2/2014 | Frait | .................. | F16D 48/0206 417/313 |
| 8,836,181 B2 * | 9/2014 | Iwase | ....................... | B60K 6/40 310/67 R |
| 9,068,638 B2 | 6/2015 | Iwase et al. | | |
| 9,085,295 B2 * | 7/2015 | Kamiyama | ............. | B60K 6/40 |
| 9,263,924 B2 | 2/2016 | Frait et al. | | |

(Continued)

OTHER PUBLICATIONS

International Search Report and Written Opinion for corresponding PCT application.

*Primary Examiner* — John K Kim
(74) *Attorney, Agent, or Firm* — Davidson, Davidson & Kappel, LLC

(57) ABSTRACT

A drive unit for a hybrid module includes a housing assembly and an electric motor including a stator and a rotor. The stator is fixed to the housing assembly. The drive unit further includes an assembly configured for rotatably connecting the rotor to an internal combustion engine The assembly includes a shaft configured for connecting to the internal combustion engine, a rear ball bearing on the shaft and a bearing housing on an outer race of the rear ball bearing. The bearing housing axially abuts the rear ball bearing so the rear ball bearing limits rearward axial movement of the bearing housing relative to the shaft. In other words, axial thrust from the bearing housing is transferred to the shaft by the axial load carrying capacity of the ball bearing.

14 Claims, 5 Drawing Sheets

(56) References Cited

U.S. PATENT DOCUMENTS

| | | |
|---|---|---|
| 2012/0216883 A1* | 8/2012 | Frait .................. F16D 48/0206 137/511 |
| 2013/0088109 A1* | 4/2013 | Frait ..................... H02K 7/006 310/90 |
| 2015/0175154 A1 | 6/2015 | Frait et al. |
| 2015/0211583 A1* | 7/2015 | Jugovic .................. B60L 50/16 192/48.1 |
| 2016/0105060 A1 | 4/2016 | Lindemann et al. |
| 2017/0002701 A1* | 1/2017 | Kajiura .................... H02K 5/04 |
| 2019/0273410 A1* | 9/2019 | Satyaseelan ........... H02K 5/163 |

* cited by examiner

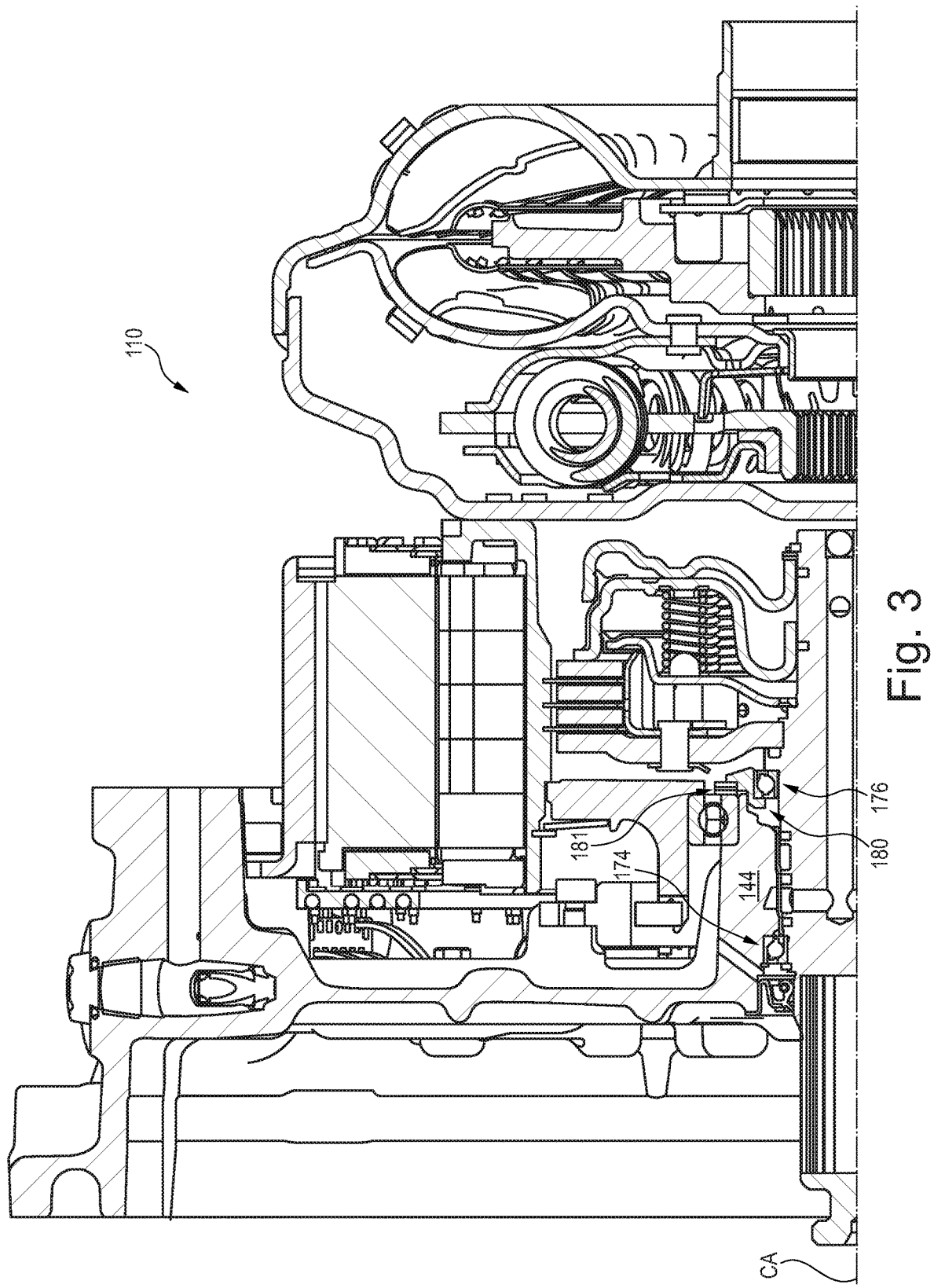

HYBRID MODULE INCLUDING AXIAL RETENTION HOUSING FOR BEARING

The present disclosure relates generally to axial retention of bearings and more specifically to axial retention of bearings in hybrid modules.

BACKGROUND

U.S. Publication No. 2015/0175154, U.S. Publication No. 2016/0105060, U.S. application Ser. No. 15/801,845 and U.S. application Ser. No. 15/844,238 disclose modular hybrid transmissions with torque converters.

SUMMARY OF THE INVENTION

A drive unit for a hybrid module is provided. The drive unit includes a housing assembly and an electric motor including a stator and a rotor. The stator is fixed to the housing assembly. The drive unit further includes an assembly configured for rotatably connecting the rotor to an internal combustion engine. The assembly includes a shaft configured for connecting to the internal combustion engine. The assembly includes a rear ball bearing with an inner race supported on the shaft and a bearing housing on an outer race of the rear ball bearing. The bearing housing axially abuts the rear ball bearing so the rear ball bearing limits rearward axial movement of the bearing housing. As discussed below, a ball bearing absorbs axial loads so that rearward axial movement of the bearing housing is transferred from the outer race through the balls to the inner race where it is supported by the shaft.

According to embodiments of the drive unit, the bearing housing may include a radially extending wall axially abutting the outer race of the rear bearing. The shaft may include a shoulder axially abutting an inner race of the rear bearing. The rear bearing may be sandwiched axially between the shoulder and the radially extending wall. The housing assembly may include an axially extending protrusion including an inner circumferential surface defining an inner circumference of the housing assembly. The bearing housing radially abutting abuts an axially extending surface at a free end of the axially extending protrusion. The electric motor may include a rotor flange and the housing assembly may include a rotor bearing on an outer circumferential surface of the protrusion contacting the rotor flange. The bearing housing may include a radially outer section arranged for limiting rearward axial movement of an inner race of the rotor bearing. The disconnect assembly may include an axial spring supported by the radially outer section of the bearing housing. The radially outer section of the bearing housing axially preloading the inner race of the rotor bearing against a shoulder on the outer circumferential surface of the protrusion. The assembly may be a disconnect assembly configured for selectively rotatably connecting the rotor to and disconnecting the rotor from the internal combustion engine. The disconnect assembly may further include a reaction plate, at least one clutch plate and a piston for forcing the at least one clutch plate against the reaction plate. The bearing housing may be axially between the reaction plate and the free end of the protrusion. A front bearing may be on the shaft radially between the inner circumferential surface of the protrusion and an outer circumferential surface of the shaft. The front bearing and the rear bearing may be angular contact bearings or deep groove ball bearings that absorb axial loads as well as radial loads as described herein. The bearing housing may axially abut the free end of the protrusion to limit frontward axial movement of the rear bearing.

A hybrid module configured for arrangement in the torque path upstream from a transmission and downstream from an internal combustion engine is also provided. The hybrid module includes the drive unit and a torque converter fixed to the electric motor.

A method of assembling a hybrid module is also provided. The method includes mounting a rear ball bearing and a bearing housing on a shaft to form an assembly. The bearing housing is mounted on an outer race of the rear ball bearing. The method also includes connecting the assembly to an electric motor by connecting an output of the assembly to a rotor of the electric motor, and assembling the connected assembly and electric motor onto a housing assembly such that the bearing housing axially abuts the rear ball bearing so the rear ball bearing limits rearward axial movement of the bearing housing as described above.

According to embodiments of the method, the method may include non-rotatably fixing a motor flange to the rotor before connecting the output of the assembly to the rotor and before assembling the connected assembly and the electric motor onto the housing assembly. The housing assembly may include an axially extending protrusion including an inner circumferential surface defining an inner circumference of the housing assembly. The bearing housing may radially abut an axially extending surface at a free end of the axially extending protrusion. The housing assembly may include a rotor bearing on an outer circumferential surface of the protrusion and contacting the rotor flange. The rotor bearing may be an angular contact bearing or a deep groove ball bearing as described above. The bearing housing may include a radially outer section arranged for limiting rearward axial movement of an inner race of the rotor bearing. The bearing housing may include a radially extending wall axially abutting the outer race of the rear bearing. The shaft may include a shoulder and the mounting the rear bearing on the shaft may include axially thrusting an inner race of the rear bearing into the shoulder. The method may include mounting a front bearing on the shaft radially between the inner circumferential surface of the protrusion and the outer circumferential surface of the shaft after the assembling of the connected assembly and electric motor onto the housing assembly. The method may include fixing a torque converter to the rotor before the connecting of the assembly to the electric motor.

BRIEF DESCRIPTION OF THE DRAWINGS

The present disclosure is described below by reference to the following drawings, in which:

FIG. 3 shows a radial cross-sectional view of a hybrid module in accordance with an another embodiment of the present disclosure.

DETAILED DESCRIPTION

The rotor bearing in a hybrid module can have a floating arrangement, wherein the bearing movement towards the transmission is not arrested. This implies that when there is a load pushing the rotating assembly towards the transmission, the interface of the rotor bearing and the housing allows for sliding and hence the whole rotating assembly moves towards the transmission by the amount of gap between the rotor flange and a disconnect assembly flow dam. The disconnect assembly has the final assembly snap ring holding it in place with respect to the housing assembly. This snap ring then prevents further movement of the rotating assembly towards the transmission. It has been identified that there are vehicle conditions such as "starting vehicle on a grade with no pressure in the TC" which introduces the load tending to push the rotating assembly towards the transmission. This causes interference between the impeller hub and the transmission front support.

The present disclosure provides embodiments of a bearing which has a capability to take up combined axial as well as radial loads. The bearing is pressed into a small aluminum piece, called the bearing housing to form a bearing assembly. This pressed bearing assembly has a tight slip fit to the shaft and the hybrid module housing, in order to maintain disconnect assembly centering function. The bearing inner race thrusts against the disconnect shaft shoulder and the outer race is pressed against a wall of the bearing housing. The bearing housing has the radial extension which extends upwards and forms an axial retention feature for the big rotor ball bearing. During assembly, the bearing housing assembly is slipped over the disconnect shaft and the disconnect assembly is processed. Then the disconnect assembly is dropped into the rotating assembly and the rotor flange assembly is assembled after that, along with the spring and snap ring. Then this combined assembly is assembled into the housing assembly and a front shaft bearing is installed and the lower snap ring is fitted. This configuration reduces the amount of rotating assembly play by considerable amounts such that when the rotating assembly starts to slide towards the transmission, it will slide until the bearing hits the bearing housing and then the load of the rotating assembly is routed into the housing assembly via the disconnect shaft and the snap ring.

Figure 1:
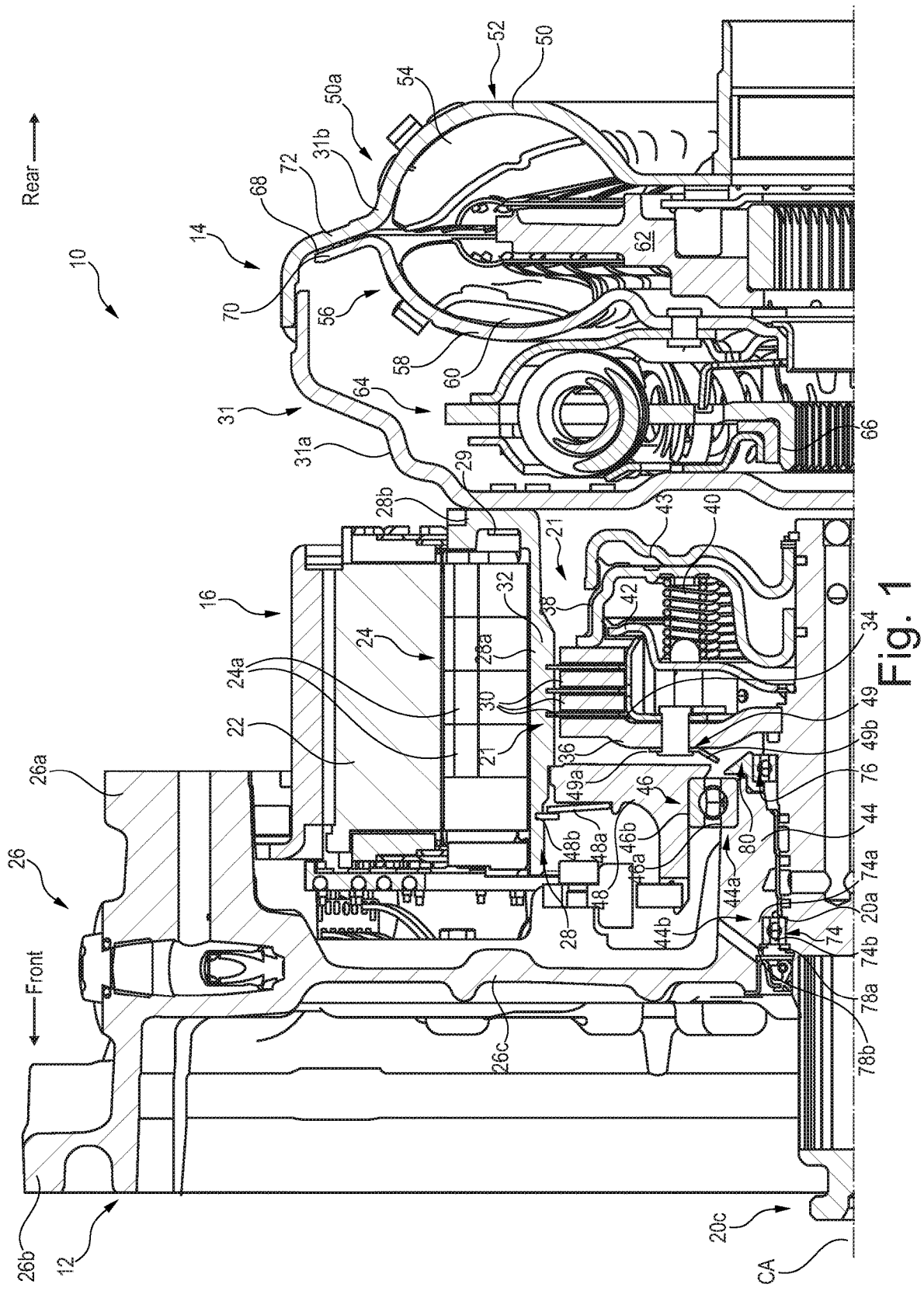
FIG. 1 shows a radial cross-sectional view of a hybrid module in accordance with an embodiment of the present disclosure.

FIG. 1 shows a radial cross-sectional view of hybrid module 10 in accordance with an embodiment of the present disclosure. Module 10 includes a hybrid drive unit 12 configured for attachment to an internal combustion engine and a torque converter 14 configured for attachment to a transmission input shaft. Hybrid drive unit includes an electric motor 16, a disconnect assembly 18 configured for selectively connecting and disconnecting to the internal combustion engine and housing assembly 26. In a known manner, hybrid drive unit 12 is selectively operable via disconnect assembly 18 to transmit torque from the internal combustion engine to torque converter 14 or directly drive torque converter 14 via electric motor 16, or to drive torque converter 14 via both electric motor 16 and the internal combustion engine together. Along these lines, disconnect assembly 18 includes a shaft 20, which is configured for non-rotatably connecting for example via a flywheel to a crankshaft of the internal combustion engine, and an engine connect/disconnect clutch 21. Clutch 21 is configured for selectively connecting torque converter 14 to shaft 20 such that torque converter 14 can be driven by the internal combustion engine with or without electric motor 16 or disconnecting torque converter 14 from input shaft 20 such that torque converter can be driven solely by electric motor 16.

Electric motor 16 includes a stator 22 and a rotor 24, with stator 22 being fixed to housing assembly 26 at an axially protruding transmission side flange 26a of housing assembly 26. Housing assembly 26 further includes an axially protruding engine side flange 26b protruding opposite of flange 26a. Upon current being provided to coils of stator 22, rotor 24 is rotated about a center axis CA of hybrid module 10 in a known manner, due to rotor 24 including a plurality of permanent magnet segments 24a that are energized by the current in the coils. The terms axially, radially and circumferentially as used herein are used with respect to center axis CA. Magnet segments 24a are supported at their inner circumferences by a rotor carrier hub 28. Rotor carrier hub 28 includes a cylindrical axially extending section 28a supporting the inner circumferences of magnet segments 24a and a radially extending section 28b protruding radially outward from an end of axially extending section 28a. Torque converter 14 is fixed to hybrid drive unit 12 at radially extending section 28b of rotor carrier hub 28 by a plurality of fasteners 29 passing through a cover 31 of torque converter 14.

Clutch 21 includes a plurality of clutch plates 30, at least some of which are supported in an axially slidable manner at outer diameter ends thereof by splines 32 formed on an inner circumferential surface of axially extending section 28a. At least one of clutch plates 30 is supported in an axially slidable manner at an inner diameter end thereof by an inner support 34 that is fixed to a reaction plate 36, which is nonrotatably fixed to shaft 20, by rivets. Clutch 21 further includes a piston 38 that is axially slidable along an outer circumference of shaft 20 to engage and disengage clutch 21 based on fluid pressure differences on front and rear sides of piston 38. When piston 38 forces clutch plates 30 against reaction plate 36, clutch 21 is engaged and torque from shaft 20 is transmitted through clutch plates 30 into rotor carrier hub 28, which then transmits the received torque to damper assembly 14. Piston 38 is held axially away from clutch plates 30 by a spring 40 supported by a support plate 42. Clutch 21 also includes a liftoff control plate 43 that limits the liftoff of piston 38 with respect to clutch plates 30.

Housing 26 includes an axially extending protrusion 44 defining an inner circumference thereof provided on an engine side of clutch 21 radially outside of shaft 20. Protrusion 44 extends axially away from a radially extending section 26c of housing 26, which extends radially along the electric motor 16, and axially toward torque converter 14 and supports a rotor bearing 46, which in this embodiment is a ball bearing rotatably supporting a rotor flange 48 on protrusion 44, on a shoulder 44a formed on an outer circumferential surface thereof. An inner race 46a of ball bearing 46 sits on an outer circumferential surface of protrusion 44 and rotor flange 48 extends from an outer circumferential surface of an outer race 46b of ball bearing 46 to axially extending section 28a of rotor carrier hub 28. Rotor flange 48 is non-rotatably fixed to an inner circumferential surface of axially extending section 28a of rotor carrier 28 by for example splines and is axially fixed in place by a rotor spring 48a abutting a rotor snap ring 48b axially fixed to axially extending section 28a of rotor carrier hub 28. Disconnect assembly 18 further includes a flow dam 49 in a space axially between rotor flange 48 and reaction plate 36. Flow dam 49 includes a radially outer portion 49a that is fixed to reaction plate 49 by rivets and an angular radially inner portion 49b that extends radially inward and axially away from reaction plate at a non-perpendicular angle with respect to center axis CA.

Torque converter 14 includes a front cover 31a and a rear cover 31b together forming cover 31, with fasteners 29 passing axially through a radially extending section of front cover 31a, which extends radially inward to intersect center axis CA. Rear cover 31b includes forms an impeller shell 50 of an impeller 52 that includes a plurality of impeller blades 54, which are supported by a rounded blade supporting portion 50a of impeller shell 50, which is shaped as an annular bowl and contacts rear edges of impeller blades 54.

Torque converter 14 also includes a turbine 56 configured to define a piston that is axially moveable toward and away from impeller shell 50 such that an engagement section of turbine 56 engages an engagement section of impeller shell 50 so as to form a lockup clutch. Turbine 56 includes a turbine shell 58 supporting a plurality of turbine blades 60. Torque converter 14 also includes a stator 62 axially between turbine 56 and impeller 52 to redirect fluid flowing from the turbine blades 60 before the fluid reaches impeller blades 54 to increase the efficiency of torque converter 14. Torque converter 14 further includes a damper assembly 64 fixed to turbine shell 58. Damper assembly 64 is configured for receiving torque from turbine shell 58 and transferring torque to the transmission input shaft. For transferring torque to the transmission input shaft, damper assembly 64 includes a support hub 66, which includes a splined inner circumferential surface for non-rotatably connecting to an outer circumferential surface of the transmission input shaft.

A friction material 68 is bonded onto a radially extending impeller facing surface of an outer radial extension 70 of turbine shell 58, which is radially outside of blades 60 and forms the engagement section of turbine 56, for engaging a radially extending wall 72 of impeller shell 50, which is radially outside of blades 54 and forms the engagement section of impeller shell 50. In other embodiments, instead of or in addition to being bonded to outer radial extension 70, friction material 68 may be bonded to radially extending turbine facing surface of radially extending wall 72 or to one or more additional discs between radially extension 70 and wall 72. Regardless of whether friction material 68 is bonded to outer radial extension 70, radially extending wall 72 or one or more additional discs, friction material 68 is provided axially between extension 70 and wall 72 to selectively rotationally engage the engagement section of turbine piston 56 with the engagement section of impeller shell 50. Torque converter 14 receives torque input from hybrid drive unit 12 through fasteners 29 at front cover 31a, which is transmitted to impeller 52. Impeller 52 drives turbine 56 via fluid flow from impeller blades 54 to turbine blades 60, when the lockup clutch is disengaged, or via friction material 68, when the lockup clutch is engaged. Turbine 56 then drives damper assembly 64, which in turn drives the transmission input shaft.

Referring back to disconnect assembly 18, it further includes an engine side or front ball bearing 74 and a torque converter side or rear ball bearing 76 for supporting shaft 20 for rotation with respect to housing assembly 26. In the embodiment shown in FIG. 1, both ball bearings 74, 76 are formed as deep groove ball bearings. Deep groove ball bearings are advantageous in the present context at least because they are configured for absorbing axial and radial loads. In contrast, U.S. Publication No. 2016/0105060 discloses using needle bearings, which only absorb radial loads. Front ball bearing 74 includes an outer race 74a radially and axially abutting a step 44b formed in an inner circumferential surface of protrusion 44 and an inner race 74b radially and axially abutting a shoulder 20a formed in the outer circumferential surface of shaft 20. Front ball bearing 74 is held axially in place on shaft 20 by a snap ring 78a axially abutting a front radially extending surface of inner race 74b and held axially in place on protrusion 44 by a snap ring 78b axially abutting a front radially extending surface of outer race 74a. A bearing housing 80 is provided radially and axially between protrusion 44 and shaft 20.

Figure 2A:
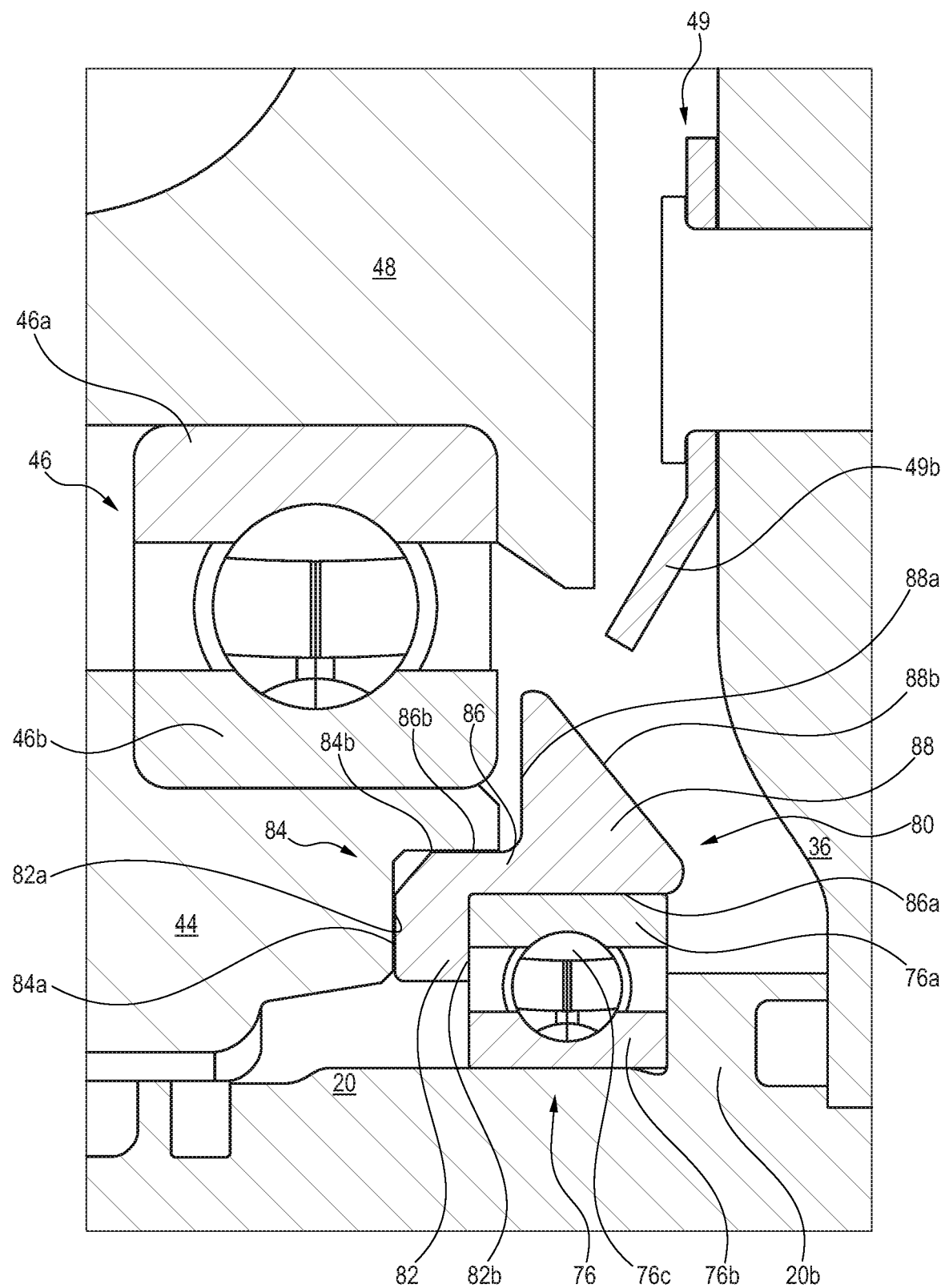
FIG. 2a shows an enlarged radial cross-sectional view of a portion of the hybrid module shown in FIG. 1.
Figure 2B:
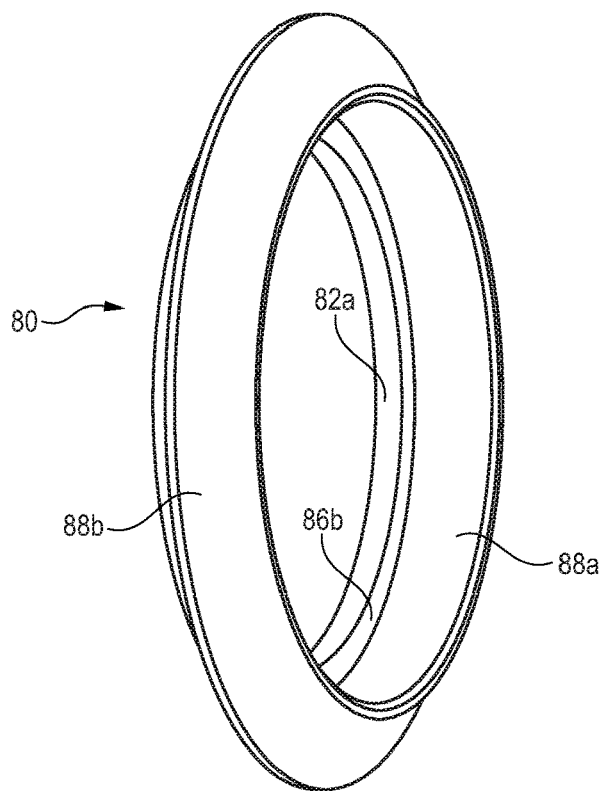
FIG. 2b shows a rear side perspective view of a bearing housing of the hybrid module shown in FIG. 1.
Figure 2C:
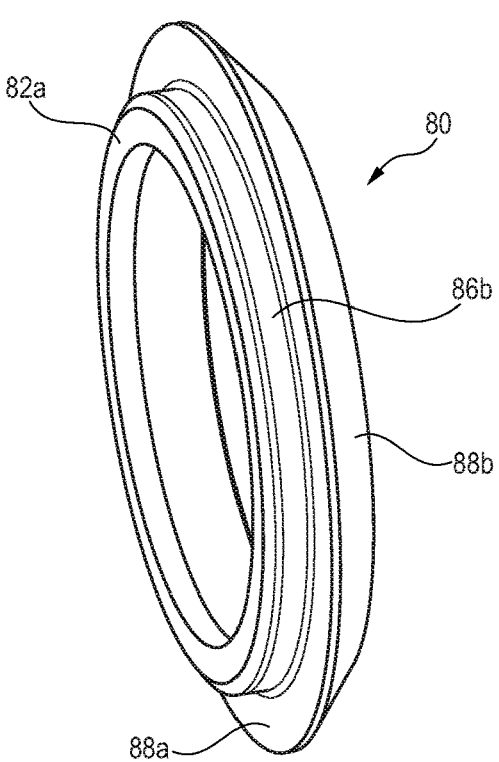
FIG. 2c shows a front side perspective view of the bearing housing shown in FIG. 2b.
Figure 2D:
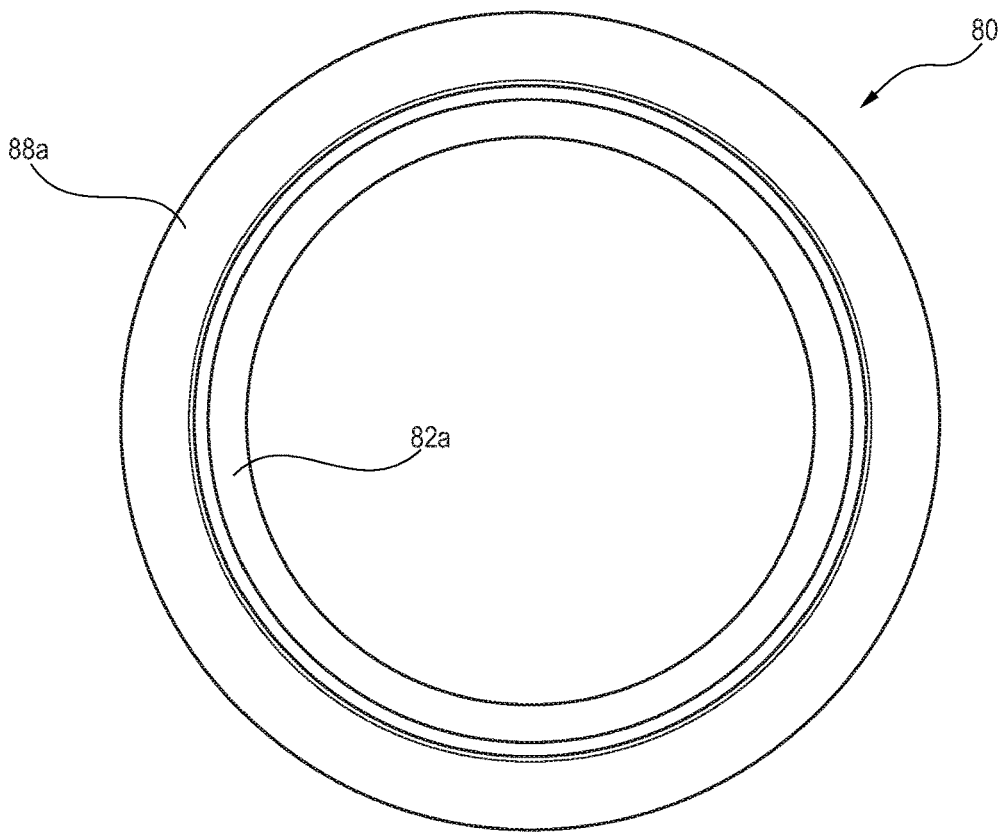
FIG. 2d shows a front side plan view of the bearing housing shown in FIG. 2b.

FIG. 2a shows an enlarged radial cross-sectional view of rear ball bearing 76 and bearing housing 80, and FIGS. 2b to 2d show different views of bearing housing 80. Rear ball bearing 76 includes an outer race 76a radially and axially abutting bearing housing 80 and an inner race 76b radially and axially abutting a shoulder 20b formed in the outer circumferential surface of shaft 20. Rolling members in the form of balls 76c are provided between outer race 76a and inner race 76b.

Bearing housing 80 is formed as a ring including a radially inner radially extending wall 82 for axially abutting outer race 76a and protrusion 44. In one preferred embodiment, bearing housing is formed of a single piece of aluminum. More specifically, protrusion 44 includes a step 84 formed at axial rear end thereof and a front radially extending surface 82a of wall 82 abuts a radially extending surface 84a of step 84, while a rear radially extending surface 82b of wall 82 abuts a radially extending surface of outer race 76a. Bearing housing 80 further includes an axially extending wall 86 extending axially away from wall 82 along the outer circumferential surface of outer race 76a. An inner circumferential surface 86a of wall 86 contacts the outer circumferential surface of outer race 76a and an outer circumferential surface 86b of wall 86 contacts an axially extending surface 84b of step 84 such that bearing housing 80 holds bearing 76 radially in place on shaft 20. Bearing housing 80 further includes a radially outer section 88 extending radially outwardly from wall 86. Radially outer section 88 includes a front radially extending surface 88a arranged to axially retain inner race 46b of bearing 46 and a rear radially extending surface 88b facing radially inner portion 49b of dam 49 and reaction plate 36. Due to tolerances of shaft 20, snap ring 78a and the bearings themselves, there is a small gap axially between surface 88a and rotor bearing inner race 46a, for assembly. This gap becomes the new allowable play which a rotating assembly formed by motor 16 and torque converter 14 moves. Outer section 88 has a wedge shaped cross-section as viewed radially such that surface 88b extends radially and axially and is arranged at a non-perpendicular angle with respect to center axis CA (FIG. 1). Surface 88b forms an acute angle with surface 88a.

Referring to FIGS. 1 and 2a together, a method of assembling drive unit 12 involves pressing rear bearing 76 into bearing housing 80 to form a bearing assembly and then slipping the bearing assembly onto a front axial end 20c of shaft 20 and thrusting the rear bearing 76 against shoulder 20b of shaft 20. Prior to, after or simultaneous with the assembly of disconnect assembly 21, electric motor 16 and torque converter 14 are connected together via fasteners 29 to form a rotating assembly. An output of the disconnect assembly 21 is then connected to rotor 18 of the rotating assembly by inserting clutch plates 30 onto splines 32 of rotor carrier 28. Next, rotor flange 48 is fixed onto rotor carrier 28 via spring 48a and snap ring 48b. The resulting assembly is then assembled into housing assembly 26, and front bearing 74 is installed onto shaft 20, then snap ring 78a is installed on shaft 20. This configuration reduces the amount of play of the rotating assembly by considerable amounts. Accordingly, when the rotating assembly starts to slide towards the transmission, the rotating assembly will slide until bearing 46 hits the bearing housing 80 and then the load of the rotating assembly is routed into housing assembly 26 via shaft 20 and snap ring 78a.

Figure 4:
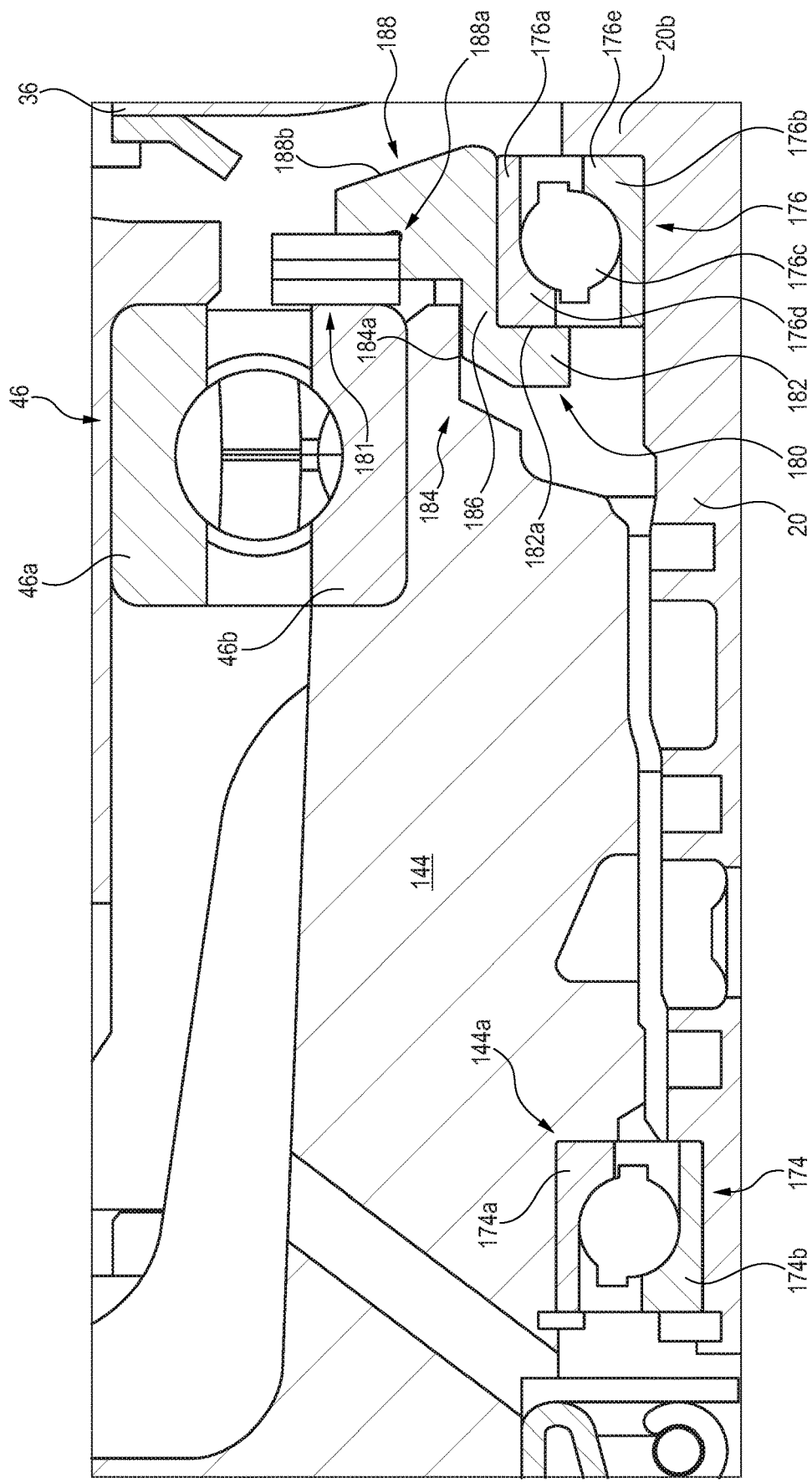
FIG. 4 shows an enlarged radial cross-sectional view of a portion of the hybrid module shown in FIG. 3.

FIG. 3 shows a radial cross-sectional view of a hybrid module 110 in accordance with another embodiment. Hybrid module 110 is configured in the same manner as hybrid module 10 except that roller bearings 74, 76 are replaced by angular contact bearings 174, 176. respectively, bearing housing 80 is replaced by a bearing housing 180 and an axial spring 181 and protrusion 44 is replaced with a protrusion 144 having a slightly modified rear axial end. FIG. 4 shows an enlarged cross-sectional view of a portion of hybrid module 110 including the components of the hybrid module 110 that vary from the embodiment of FIGS. 1 and 2a.

Front annular contact bearing 174 includes an outer race 174a radially and axially abutting a step 144a of protrusion 144 and an inner race 174b radially and axially abutting shoulder 20a of shaft 20. Front ball bearing 174 is held axially in place on shaft 20 by snap ring 78a axially abutting a front radially extending surface of inner race 174b and held axially in place on protrusion 144 by snap ring 78b axially abutting a front radially extending surface of outer race 174a.

Rear ball bearing 176 includes an outer race 176a radially and axially abutting bearing housing 180 and an inner race 176b radially and axially abutting shoulder 20b of shaft 20. Rolling members in the form of balls 176c are provided between outer race 176a and inner race 176b.

Bearing housing 180 is formed as a ring including a radially inner radially extending wall 182 for axially abutting outer race 176a. In one preferred embodiment, bearing housing 180 is formed of a single piece of aluminum. More specifically, a rear radially extending surface 182a of wall 182 abuts a radially extending surface of outer race 176a. In the embodiment of FIGS. 3 and 4, outer race 176a includes a front side radial flange 176d axially abutting radially extending surface 182a of wall 182 and inner race 176b includes a rear side radial flange 176e axially abutting shoulder 20b such that rear bearing 176 is axially sandwiched between wall 182 and shoulder 20b.

Bearing housing 180 further includes an axially extending wall 186 extending axially away from wall 182 along the outer circumferential surface of outer race 176a. An inner circumferential surface 186a of wall 186 contacts the outer circumferential surface of outer race 176a and an outer circumferential surface 186b of wall 186 contacts an axially extending surface 184a of a step 184 of protrusion 144, which is formed at a rear axial end thereof, such that bearing housing 180 holds bearing 176 radially in place on shaft 20. Bearing housing 180 further includes a radially outer section 188 extending radially outwardly from wall 186. Radially outer section 188 includes a step 188a on a front side thereof configured for supporting axial spring 181. Bearing housing 180 preloads axial spring 181 against a rear side radially extending surface of inner race 46b of bearing 46 to retain bearing 46 axially in place. Axial spring 181 may be a wave spring or a diaphragm spring. Radially outer section 188 further includes a rear radially extending surface 188b facing reaction plate 36, with surface 188b extending radially and axially and being arranged at a non-perpendicular angle with respect to center axis CA (FIG. 3). Hybrid module 110 is assembled in the same manner as hybrid module 10.

Spring 181 is a medium rate spring designed to have enough stiffness, such that it will not deflect at 2-3 g's of rotating assembly weight in order for starting a vehicle on a grade condition. Thus spring 181 keeps the rotor bearing 46 pressed against housing assembly 26 under the concerned conditions and thereby there is no slippage of the rotating assembly. Assembly of the rotating assembly involves pulling shaft 20 with enough force to compress spring 181 and install the snap ring 78a.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
12 hybrid drive unit
14 torque converter
16 electric motor
18 engine connect/disconnect assembly
20 shaft
21 clutch
22 stator
24 rotor
24a magnet segments
26 housing assembly
26a axially protruding transmission side flange
26b axially protruding engine side flange
26c radially extending section
28 rotor carrier hub
28a cylindrical axially extending section
28b radially extending section
29 fasteners
30 clutch plates
31 cover
31a front cover
31b rear cover
32 splines
34 inner support
36 reaction plate
38 piston
40 spring
42 support plate
43 liftoff control plate
44 housing protrusion
46 rotor bearing
46a inner race
46b outer race
49 rotor flange
48a rotor spring
48b snap ring
49 flow dam
50 impeller shell
50a rounded blade supporting portion
52 impeller
54 impeller blades
56 turbine
58 turbine shell
60 turbine blades
62 stator
64 damper assembly 66 support hub
68 friction material
70 outer radial extension
72 radially extending wall
74 front ball bearing
74a inner race
74b outer race
76 rear ball bearing
76a outer race
76b inner race
76c balls
78a snap ring
78b snap ring
80 bearing housing
82 radially extending wall
82a front radially extending surface
82b rear radially extending surface
84 step
84a radially extending surface
84b axially extending surface
86 axially extending wall
86a inner circumferential surface
86b outer circumferential surface
88 radially outer section
88a front radially extending surface
88b rear radially extending surface
110 hybrid module
144 protrusion
144a step
174 front angular contact bearing
174a inner race
174b outer race
176 rear angular contact bearing
176a outer race
176b inner race
176c balls
176d front side radial flange
176e rear side radial flange
180 bearing housing
181 axial spring
182 radially extending wall
182a rear radially extending surface
184 step
184a axially extending surface
186 axially extending wall
186a inner circumferential surface
186b outer circumferential surface
188 radially outer section
188a step
188b rear radially extending surface

What is claimed is:

1. A drive unit for a hybrid module, the drive unit configured for facing frontward toward an internal combustion engine and rearward toward a transmission, the drive unit comprising:
a housing assembly;
an electric motor including a stator and a rotor, the stator being fixed to the housing assembly; and
an assembly configured for rotatably connecting the rotor to the internal combustion engine, the assembly including a shaft configured for connecting to the internal combustion engine, the assembly including a rear bearing on the shaft and a bearing housing on an outer race of the rear bearing, the bearing housing being distinct from the housing assembly and formed as a ring including a rearward facing surface axially abutting the rear bearing,
wherein the housing assembly includes an axially extending protrusion including an inner circumferential surface defining an inner circumference of the housing assembly, the bearing housing radially abutting an axially extending surface at a free end of the axially extending protrusion,
wherein the electric motor includes a rotor flange with a rotor bearing, the rotor bearing is installed on an axially extending protrusion outer circumferential surface contacting the rotor flange, and the bearing housing includes a radially outer section with a radially extending surface arranged for limiting rearward axial movement of rotor bearing inner race relative to the shaft if the rotor bearing slides towards the transmission during operation of the drive unit.

2. The drive unit as recited in claim 1 wherein the shaft includes a shoulder axially abutting a rear bearing inner race, the rear bearing being sandwiched axially between the shoulder and the rearward facing surface.

3. The drive unit as recited in claim 1 wherein the assembly further includes an axial spring supported by the radially outer section of the bearing housing, the radially outer section of the bearing housing axially preloading the rotor bearing inner race against a shoulder on the axially extending protrusion outer circumferential surface.

4. The drive unit as recited in claim 1 wherein the assembly is a disconnect assembly configured for selectively rotatably connecting the rotor to and disconnecting the rotor from the internal combustion engine, the disconnect assembly further including a reaction plate, at least one clutch plate and a piston for forcing the at least one clutch plate against the reaction plate, the radially outer section being axially between the reaction plate and the free end of the axially extending protrusion.

5. The drive unit as recited in claim 1 further comprising a front bearing on the shaft radially between the inner circumferential surface of the axially extending protrusion and a shaft outer circumferential surface.

6. The drive unit as recited in claim 5 wherein the front bearing and the rear bearing are angular contact bearings or deep groove ball bearings.

7. The drive unit as recited in claim 1 wherein the bearing housing axially abuts the free end of the axially extending protrusion to limit frontward axial movement of the rear bearing.

8. A hybrid module configured for arrangement in the torque path upstream from the transmission and downstream from the internal combustion engine, the hybrid module comprising:
the drive unit as recited in claim 1; and
a torque converter fixed to the rotor of the electric motor, the torque converter configured for transferring torque from the drive unit to the transmission.

9. A method of assembling a hybrid module comprising:
providing the drive unit as recited in claim 1, the providing of the driving unit comprising:
mounting the rear bearing and the bearing housing on the shaft to form an assembly, the bearing housing being mounted on the outer race of the rear bearing;
connecting the assembly to the electric motor by connecting an output of the assembly to the rotor of the electric motor; and
assembling the connected assembly and electric motor onto the housing assembly such that the rearward facing surface of the bearing housing axially abuts the rear bearing.

10. The method as recited in claim 9 further comprising non-rotatably fixing the rotor flange to the rotor after connecting the output of the assembly to the rotor and before assembling the connected assembly and the electric motor onto the housing assembly.

11. The method as recited in claim 10 wherein the housing assembly includes an axially extending protrusion including an axially extending protrusion inner circumferential surface defining an inner circumference of the housing assembly, the bearing housing radially abutting an axially extending surface at the free end of the axially extending protrusion.

12. The method as recited in claim 11 wherein the bearing housing includes a radially extending wall axially abutting the outer race of the rear bearing.

13. The method as recited in claim 12 wherein the shaft includes a shoulder, the mounting the rear bearing on the shaft including axially thrusting the rear bearing inner race into the shoulder.

14. The method as recited in claim 12 further comprising mounting a front bearing on the shaft radially between the inner circumferential surface of the protrusion and an outer circumferential surface of the shaft after the assembling of the connected assembly and electric motor onto the housing assembly.

\* \* \* \* \*